United States Patent
Mukherjee et al.

(10) Patent No.: US 12,443,423 B2
(45) Date of Patent: Oct. 14, 2025

(54) METHODS AND SYSTEM FOR PROVIDING CUSTOMIZED ACQUISITION PROTOCOLS

(71) Applicant: Synchrony Bank, Stamford, CT (US)

(72) Inventors: Joydeep Mukherjee, Stamford, CT (US); Karen Yagnesak, Stamford, CT (US); Viveka Vardhan Ravi, Stamford, CT (US); Sarath Vadakapurapu, Stamford, CT (US); Ravish Kumar, Stamford, CT (US); Vish Dadireddy, Stamford, CT (US)

(73) Assignee: Synchrony Bank, Stamford, CT (US)

( * ) Notice: Subject to any disclaimer, the term of this patent is extended or adjusted under 35 U.S.C. 154(b) by 0 days.

(21) Appl. No.: 18/663,159

(22) Filed: May 14, 2024

(65) Prior Publication Data

US 2024/0354133 A1   Oct. 24, 2024

Related U.S. Application Data

(63) Continuation of application No. 17/815,423, filed on Jul. 27, 2022, now Pat. No. 12,026,534.

(60) Provisional application No. 63/203,658, filed on Jul. 27, 2021.

(51) Int. Cl.
```
G06F 9/455      (2018.01)
G06F 16/951     (2019.01)
G06F 16/958     (2019.01)
```
(52) U.S. Cl.
CPC ........ *G06F 9/45529* (2013.01); *G06F 16/951* (2019.01); *G06F 16/958* (2019.01)

(58) Field of Classification Search
CPC ... G06F 9/45529; G06F 16/958; G06F 16/951
See application file for complete search history.

(56) References Cited

U.S. PATENT DOCUMENTS

| | | | |
|---|---|---|---|
| 6,052,730 A | 4/2000 | Felciano et al. | |
| 6,919,891 B2 * | 7/2005 | Schneider | G06T 17/005 715/236 |
| 7,012,606 B2 * | 3/2006 | Swedberg | G06T 15/00 345/473 |

(Continued)

OTHER PUBLICATIONS

Office Action mailed Jul. 20, 2023 in U.S. Appl. No. 17/815,423.
Notice of Allowance mailed Feb. 28, 2024 in U.S. Appl. No. 17/815,423.

*Primary Examiner* — Nicholas Augustine
(74) *Attorney, Agent, or Firm* — Polsinelli LLP

(57) ABSTRACT

Systems and method are provided that include process that customize the presentation of webpages according to alternative acquisition protocols. The processes include receiving, from a first server, a webpage identifying an object for acquisition by a user using a first acquisition protocol. The processes then execute a call to a second server that includes an identification of a user interacting with the webpage and a request for an identification of one or more alternative acquisition protocols based on the identification of the user. In response, the processes receive JavaScript code that executes to provide information associated with the one or more alternative acquisition protocols. The processes then generating a modified webpage that includes a modification to a portion of the webpage based on at least one of the one or more alternative acquisition protocols. The modified webpage may be displayed to a user.

20 Claims, 8 Drawing Sheets

(56) References Cited

U.S. PATENT DOCUMENTS

| | | | |
|---|---|---|---|
| 7,064,766 B2 * | 6/2006 | Beda | G06T 17/00 345/557 |
| 7,088,374 B2 * | 8/2006 | David | G06T 15/00 345/503 |
| 7,126,606 B2 * | 10/2006 | Beda | G06F 8/38 345/473 |
| 7,161,599 B2 * | 1/2007 | Beda | G06T 1/20 345/506 |
| 7,173,623 B2 * | 2/2007 | Calkins | G06T 13/00 345/473 |
| 7,219,340 B2 * | 5/2007 | Schechter | G06F 8/31 717/108 |
| 7,262,775 B2 * | 8/2007 | Calkins | G06T 13/00 345/473 |
| 7,265,756 B2 * | 9/2007 | Schneider | G06T 17/005 709/219 |
| 7,509,433 B1 | 3/2009 | Hall et al. | |
| 9,342,620 B2 | 5/2016 | Joel et al. | |
| 9,843,576 B1 | 12/2017 | Peng | |
| 10,559,009 B1 * | 2/2020 | Kingman, Jr. | G06Q 30/0269 |
| 2003/0071860 A1 * | 4/2003 | Goddard | G06F 8/38 715/866 |
| 2003/0076328 A1 * | 4/2003 | Beda | G06T 15/005 345/503 |
| 2003/0076329 A1 * | 4/2003 | Beda | G06T 15/00 345/557 |
| 2003/0120614 A1 | 6/2003 | Shumpert | |
| 2003/0132937 A1 * | 7/2003 | Schneider | G06T 17/005 345/473 |
| 2004/0130550 A1 * | 7/2004 | Blanco | G06T 15/005 345/473 |
| 2004/0189645 A1 * | 9/2004 | Beda | G06T 17/005 345/473 |
| 2004/0189667 A1 * | 9/2004 | Beda | G06T 11/60 345/441 |
| 2004/0189668 A1 * | 9/2004 | Beda | G06T 11/60 345/619 |
| 2004/0189669 A1 * | 9/2004 | David | G06F 9/451 345/949 |
| 2004/0194020 A1 * | 9/2004 | Beda | G06T 17/005 715/201 |
| 2004/0222992 A1 * | 11/2004 | Calkins | G06T 13/00 345/473 |
| 2004/0233201 A1 * | 11/2004 | Calkins | G06T 13/00 345/473 |
| 2005/0041686 A1 | 2/2005 | Roy et al. | |
| 2005/0076306 A1 * | 4/2005 | Martin | G06F 9/451 715/788 |
| 2005/0088436 A1 * | 4/2005 | Swedberg | G06T 15/00 345/420 |
| 2005/0091637 A1 * | 4/2005 | Schechter | G06F 8/31 717/110 |
| 2005/0140694 A1 * | 6/2005 | Subramanian | G06T 17/005 345/619 |
| 2005/0193368 A1 * | 9/2005 | Becker | G06F 9/451 707/999.1 |
| 2006/0031529 A1 | 2/2006 | Keith | |
| 2006/0179475 A1 | 8/2006 | Zhang et al. | |
| 2010/0257232 A1 | 10/2010 | Joffray et al. | |
| 2010/0262487 A1 * | 10/2010 | Edwards | G06Q 30/02 705/14.43 |
| 2012/0144291 A1 | 6/2012 | Chang et al. | |
| 2013/0212467 A1 | 8/2013 | Ruan et al. | |
| 2015/0150109 A1 | 5/2015 | Bocanegra et al. | |
| 2018/0248863 A1 | 8/2018 | Kao et al. | |
| 2019/0262721 A1 * | 8/2019 | MacInnes | G07F 17/323 |
| 2020/0067904 A1 | 2/2020 | Hugot | |
| 2021/0081521 A1 | 3/2021 | Deng et al. | |
| 2022/0092148 A1 | 3/2022 | Ross et al. | |
| 2022/0393899 A1 | 12/2022 | Mimassi | |

\* cited by examiner

```
┌─────────────────────────────────────────────────────────────────────────┐
│ Receiving, from a first server, a webpage identifying an object for     │
│ acquisition by a user using a first acquisition protocol                │
│                              604                                         │
└─────────────────────────────────────────────────────────────────────────┘
                                    │
                                    ▼
┌─────────────────────────────────────────────────────────────────────────┐
│ Executing a call to a second server, wherein the call includes an       │
│ identification of a user interacting with the webpage and a request for │
│ an identification of one or more alternative acquisition protocols      │
│ based on the identification of the user                                 │
│                              608                                         │
└─────────────────────────────────────────────────────────────────────────┘
                                    │
                                    ▼
┌─────────────────────────────────────────────────────────────────────────┐
│ Receiving, in response to executing the call to the second server,      │
│ JavaScript code that executes to provide information associated with    │
│ the one or more alternative acquisition protocols                       │
│                              612                                         │
└─────────────────────────────────────────────────────────────────────────┘
                                    │
                                    ▼
┌─────────────────────────────────────────────────────────────────────────┐
│ Generating a modified webpage that includes a modification to a portion │
│ of the webpage based on at least one of the one or more alternative     │
│ acquisition protocols                                                    │
│                              616                                         │
└─────────────────────────────────────────────────────────────────────────┘
                                    │
                                    ▼
┌─────────────────────────────────────────────────────────────────────────┐
│                     Displaying the modified webpage                      │
│                              620                                         │
└─────────────────────────────────────────────────────────────────────────┘
```

FIG. 6

METHODS AND SYSTEM FOR PROVIDING CUSTOMIZED ACQUISITION PROTOCOLS

CROSS REFERENCE TO RELATED APPLICATIONS

The present application is a continuation of U.S. patent application Ser. No. 17/815,423 filed Jul. 27, 2022, which claims benefit to U.S. Provisional Patent Application No. 63/203,658 filed on Jul. 27, 2021, which are hereby incorporated herein by reference in their entireties.

TECHNICAL FIELD

This disclosure generally relates to execution of dynamic web-based instructions; and more specifically to generating customized webpages using dynamically acquired JavaScript.

BACKGROUND

Webpages include a variety of elements to present a particular look and feel. For example, webpages include instructions for defining layout, colors schemes, content, etc. Some webpages also include instructions that define how and when media will be presented to the user when the user access the webpage. Customizing webpages for individual users or sets of users can be difficult. Often customizing a webpage for sets of users includes defining and storing multiple versions of the webpage in advance. Pre-generating multiple versions of a webpage may not enable customizing webpages for individual users or dynamically generating webpages (e.g., when the webpage is requested) as the version of the webpage is already defined.

Some webpages may include content from multiple sources such that some content of the webpage may be determined by a different webserver from the developer of the webpage. Customizing content received from another webserver may be even more difficult as the other webserver lacks direct access to the code of the webpage. As a result, it may not be possible for the other webserver to make changes to the webpage once the webpage has been requested by a user.

SUMMARY

Methods and systems are described herein for customizing webpages configured to present dynamically defined acquisition protocols. The methods include receiving, from a first server, a webpage identifying an object for acquisition by a user using a first acquisition protocol; executing a call to a second server, wherein the call includes an identification of a user interacting with the webpage and a request for an identification of one or more alternative acquisition protocols based on the identification of the user; receiving, in response to executing the call to the second server, JavaScript code that executes to provide information associated with the one or more alternative acquisition protocols; generating a modified webpage that includes a modification to a portion of the webpage based on at least one of the one or more alternative acquisition protocols; and displaying the modified webpage.

Systems are described herein for embedding data into a video frame with a reduced likelihood of being perceived by users. The systems include one or more processors and a non-transitory computer-readable medium storing instructions that, when executed by the one or more processors, cause the one or more processors to perform any of the methods as previously described.

Non-transitory computer-readable media are described herein for storing instructions that, when executed by the one or more processors, cause the one or more processors to perform any of the methods as previously described.

These illustrative examples are mentioned not to limit or define the disclosure, but to aid understanding thereof. Additional embodiments are discussed in the Detailed Description, and further description is provided there.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 6 illustrates a flowchart of an example process for customizing a webpage to display alternative acquisition protocols according to aspects of the present disclosure.

DETAILED DESCRIPTION

Figure 1A:
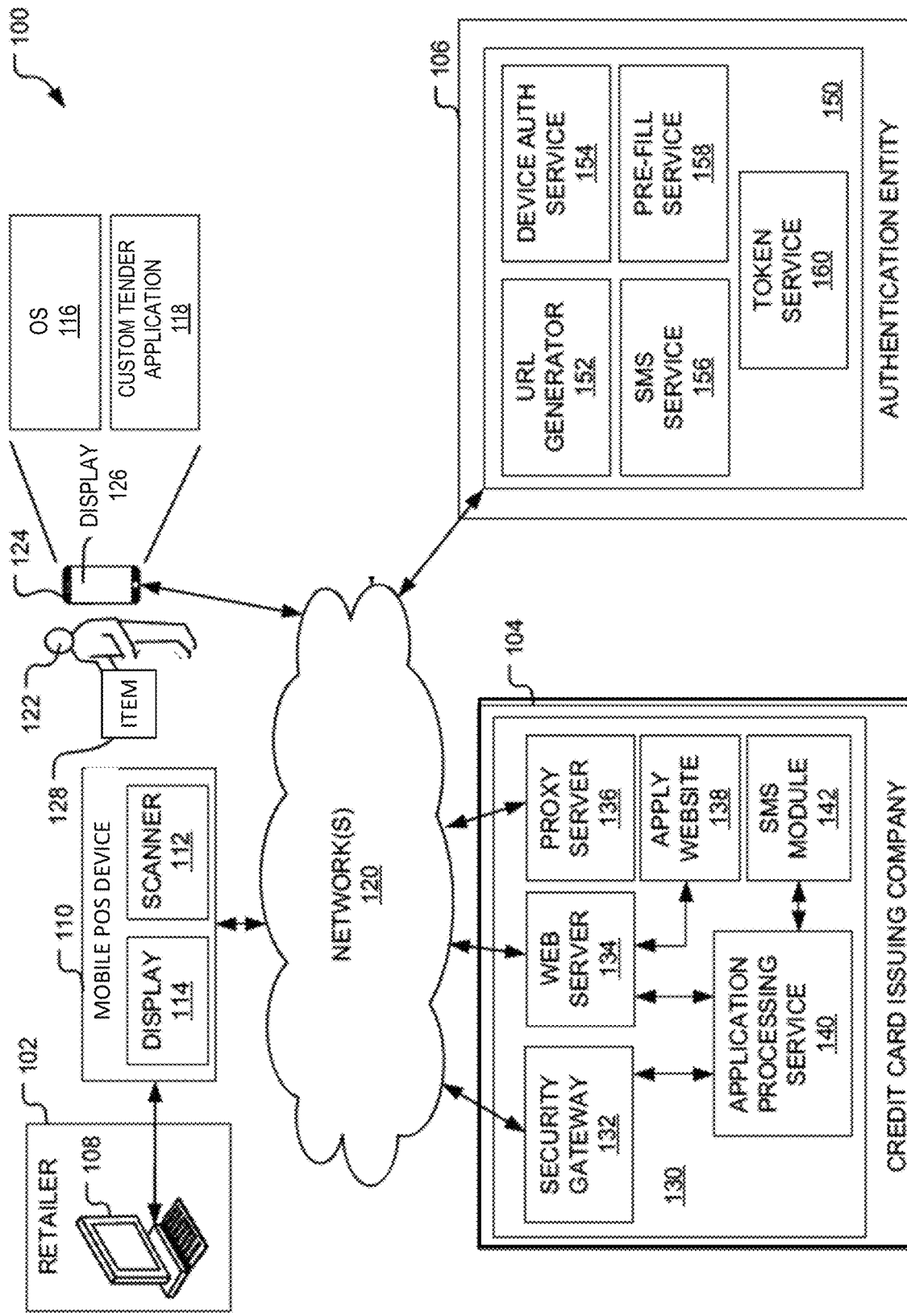
FIG. 1A illustrates an example system that can be used with identifying, displaying, and executing alternative acquisition protocols according to aspects of the present disclosure.

The present disclosure includes systems and methods for generating customizable webpages that identify, display, and execute acquisition protocols that process an acquisition of an object. A user may request a webpage from a webserver that is distributing an object. The webpage may also include a primary acquisition protocol (e.g., a process for acquiring the object). The acquisition protocol may be provided by the webhost or an operator (e.g., merchant) that is providing the object. The primary acquisition protocol may include a process of one or more steps that enable the user to acquire the object distributed by the webpage. The one or more steps may include an exchange of a set of resources between the user and/or user device and the webserver (or another webserver configured to process the set of resources). In some instances, the primary acquisition protocol may be incompatible with the user and/or user device. For instance, the user and/or user device may be prevented from executing one or more steps of the process or lack the resources to perform the exchange. As a result, the user and/or user device may be prevented from executing the primary acquisition protocol and acquiring the object.

To enable acquisition of the object, the webpage may include instructions provided by another webserver that provide dynamically defined alternative acquisition protocols that may be executed by the user device, by the other webserver (or different server), or partially by the user device and partially by the other webserver (and/or the different webserver) to enable the user to acquire the object. Once the webpage is loaded by a web-browser of the user device, the instructions execute to provide the user device a presentation that corresponds to the acquisition of the object. The presentation can include instructions and/or a link to a modal or to another webpage providing the user more information regarding alternative acquisition protocols for the object. The alternative acquisition protocols may be based on characteristics of the user (e.g., demographic information, browsing history, current location of the user or the user device, information generated or derived by the webpage and/or the like), a timestamp, current promotions of the webpage and/or of an entity associated with the acquisition protocols, and/or the like. For example, the acquisition protocol on the webpage may be an exchange of a set of resources for the object. The alternative acquisition protocol may include an exchange of the set of resources by a service provider of the alternative acquisition protocol to the operator and a transmission of a sequence of subsets of the set of resources by the user (and/or user device) to the service provider over a time interval.

The instructions provided by the other webserver may execute to provide a presentation of information associated with an alternative acquisition protocol on the webpage. The instructions may also include a call to the other webserver providing information associated with the current browsing session. The information can include, but is not limited to, an identification of the user (e.g., user identifier, geolocation), a hardware fingerprint (e.g., an identifier defined from particular hardware components of the user device), a software fingerprint (e.g., an identifier defined from the particular software and software version of the user device such operating system, web-browser, etc.), network information (e.g., media access control address, Internet Protocol address, etc. Internet Service Provider, etc.), browsing activity of the user, user interaction with the webpage, information stored in and/or derived from cookies stored on the user device, combinations thereof, or the like. The information associated with the current browsing session can be used by the other webserver to determine alternative acquisition protocols that may be usable by the user and/or user device.

The other webserver may transmit instructions (e.g., JavaScript, or the like) selected based on the information associated with the current browsing session. The instructions may execute within the webpage to provide an identification of one or more alternative acquisition protocols tailored to the user and/or user device for display. The user may interact with the newly displayed identification of the one or more alternative acquisition protocols to select an acquisition protocol for execution, receive additional information regarding one or more of the one or more alternative acquisition protocols, exclude one or more alternative acquisition protocols from further display, request additional alternative acquisition protocols, and/or the like. Interacting with the newly displayed one or more alternative acquisition protocols may cause a new webpage to be loaded or a modal to opened over the current webpage. In response, the instructions may execute another call to the other webserver based on the user interaction (e.g., to obtain new alternative acquisition protocols, additional information associated with one or more of the one or more alternative acquisition protocols, execute alternative acquisition protocols, etc.).

Alternatively, or additionally, the other webserver may transmit instructions for presenting content (information associated with objects and/or services such as, but not limited to advertisements) within the webpage, new webpage, modal, and/or the like. The content may include images, video, audio, text, or the like corresponding to the webpage and/or objects provided through the webpage, objects or services provided by the operator or other operators, objects and/or services provided by entities associated with the acquisition protocol or alternatively acquisition protocols, objects and/or services provided by an entity presenting the alternative acquisition protocols, and/or the like. In some instances, the instructions may present the content at predetermined times while the user is interacting with the webpage and/or the acquisition protocols. The instructions may retrieve the content and/or include links to one or more databases, webservers, or the like storing the content.

In some instances, the other webserver may transmit instructions configured to present an acquisition protocol landing webpage within the webpage (or via the modal) that may include content, links, etc. to various related entities configured to provide various acquisition protocols to users. The acquisition protocol landing webpage can be navigated to retrieve information associated with particular acquisition protocols, particular entities offering acquisition protocols, and/or the like. The acquisition protocol landing webpage may be preconfigured to present particular information selected by an operator of the webpage, the entities offering acquisition protocols, and/or the like. Alternatively, the acquisition protocol landing webpage may be preconfigured to present particular information selected based on user information, timestamps, promotions, or the like.

The other webserver may transmit instructions configured to access data stored by the user device to customize the presentation of the content and/or the alternative acquisition protocols to the user. In some examples, the instructions may access cookies stored by the user device to identify associations with particular entities that provide acquisition protocols, particular operators offer acquisition protocols, etc. The cookie data may store historical web browsing information associated with the user. For example, cookie data may indicate that the user is associated with a particular entity providing customized acquisition protocols. The cookie data may be used to recommend the particular entity (e.g., as an entity in which the user should request a customized acquisition protocol, etc.), recommend entities related to the particular entity (e.g., such as entities providing similar customizations, acquisition protocols, etc.), present particular content to the user, customize the webpage experience for the user, and/or the like.

FIG. 1A illustrates an example system that can be used with identifying, displaying, and executing alternative acquisition protocols according to aspects of the present disclosure. In example system 100 of FIG. 1A, POS device 110 can include a user interface element for a custom tender option as described above. The custom tender option can be presented as a user 122 is purchasing an object 128. When the custom tender option is selected on POS device 110, POS device 110 can communicate with custom tender application 118 on mobile device 124 of user 122. Additional aspects of such systems and operations of a custom tender application 118 are described below.

The example system 100 includes an operator 102 (e.g., such as a retailer, datastore, etc.), a resource issuing system 104, and an authentication entity 106. In some systems, aspects can be merged, such as for example, the authenticating entity 106 being merged with the resource issuing system 104 such that devices of entity 106 and system 104 can be the same device or devices. The operator 102 (e.g. a merchant or other client of authentication entity 106) includes an operator computing system 108 connected to at least one POS device 110. The illustrated POS device 110 includes a scanner 112 (e.g., a barcode scanner) and a display device 114. The POS device 110 of FIG. A1 can include various systems for communicating with mobile device 124. The communication systems can include Bluetooth, WiFi, or other wireless network systems for communication. In some examples, rather than communicating using local wireless communications, a code or other matching mechanism can be used to match custom tender application 118 with POS device 110 via a wide area network (e.g., the Internet) to allow communications and dynamic synchronization between POS device 110 and mobile device 124. In various implementations, the user device 124 can access various communication channels, including short message service (SMS), text, application-based communications, e-mail, web-browsers, or other such communication channels.

Once a connection is established between POS device 110 and mobile device 124, custom tender operations can be performed using custom tender application 118 as described below. Additionally, other implementations of POS device 110 can include a resource scanner or other payment input, a keypad, or other such elements. Additional examples of a POS device 110 can be a tablet device, a smartphone, a laptop computer, or any other such device that can be accessed by a user, either directly, or through an employee of the operator. The operator computing system 108 may be directly connected or connected by one or more networks 120 (described below) to the POS device 110. The operator computing system 108 and the POS device 110 may each be implemented by one or more computing devices, which may each be implemented as a computing device with architecture 700 described below and illustrated in FIG. 7.

Referring to FIG. 1A, the POS device 110 is configured to be operated by a user 122 having a user device 124 (e.g., a cellular telephone) with a display device 126 (e.g., a conventional touch screen). For example, the user 122 may acquire one or more object 128 using the POS device 110. As will be described below, the user 122 may also use the POS device 110 and the mobile device 124 to apply for resources (e.g., credit).

Referring to FIG. 1A, mobile services are provided to the mobile device 124 by a mobile service provider or carrier 170. The carrier 170 operates one or more computing devices 172 configured to communicate over the network(s) 120. The computing device(s) 172 may each be implemented as the computing device with architecture 700 described below and illustrated in FIG. 7.

The resource issuing system 104 operates one or more computing devices 130. The computing device(s) 130 implement a security gateway 132, a webserver 134, a proxy server 136, an application processing service 140, and a SMS module 142. The security gateway 132 is configured to communicate with the SCO device 110 over the network(s) 120. The webserver 134 and the proxy server 136 are both connected to the network(s) 120. The webserver 134 is configured to generate an apply website 138. The webserver 134 is also configured to generate instructions for identifying, displaying, and facilitating the execution of alternative acquisition protocols. The application processing service 140 is configured to communicate with the security gateway 132 and/or the webserver 134. The SMS module 142 is configured to communicate with the application processing service 140. The SMS module 142 may be implemented by middleware. By way of a non-limiting example, the computing device(s) 130 may each be implemented as the computing device architecture 700 described below and illustrated in FIG. 7.

The authentication entity 106 operates one or more authentication computing devices 150 configured to communicate over the network(s) 120. The authentication computing device(s) 150 may implement a Uniform Resource Locator ("URL") generator 152, a device authentication service 154, an SMS service 156, a pre-fill service 158, and/or a token service 160. By way of a non-limiting example, the authentication computing device(s) 150 may each be implemented as the computing device with architecture 700 described below and illustrated in FIG. 7.

As described herein, a user device 124 can be used in conjunction with POS device 110 to establish secure communications between user 122 and operator system 108. In some contexts, a user 122 may be concerned about privacy and communications, in particular with respect to an operator's agent that may be communicating with user 122. A user 122 can additionally have concerns about data being communicated with operator system 108 being visible to checkout agents of the operator in ways that user 122 can wish to avoid, such as the possibility of a resource request being rejected. Examples described herein use a unique URL generated by URL generate 152 of authentication entity 106 to establish secure communications between user device 124 and operator system 108 in ways that enable additional privacy and security. This also enables initiation of certain data communications using POS device 110 to allow an operator to improve sales through offers to users made through devices associated with the operator, such as POS device 110.

In various examples described herein, POS device 110 can use information from operator system 108 to identify offers available from system 104. In response to an indication of interest from a user 122 (e.g. using POS device 110), the operator computing system 108 can communicate request data to authentication entity 106. This can include identifying information from POS device 110 or user device 124 that can be used by device authentication service 154 to confirm information regarding devices related to the request data. This can include data about a location or store associated with POS device 110. This can include identifying account information, location information, or any other such context information about user device 124. The request data and information from device authentication service 154 can also provide information to other services. For example, SMS service 156 can identify whether authentication entity 106 has authorization to communicate with user device 124 in accordance with regulations limiting the ability for a business to initiate communications with user devices such as device 124. Additionally, based on other information associated with the request data, such as an expected resource request associated with the request data, pre-fill service 158 can be activated to identify or generate information for a resource request or other such information to be used in a subsequent communication from authentication entity 106 to either user device 124 or POS device 110.

Token service 160 may operate to facilitate secure communications between user 122 and various services and devices including, but not limited to, operator computing system 108 and resource issuing system 104. Additionally, token service 160 can tokenize a URL generated for user 122 by URL generator 152 in response to request data received via operator computing system 108. Tokenization is a process of substituting sensitive data elements with non-sensitive equivalents (e.g., tokens). The token is a reference identifier that can be mapped to the sensitive data via token service 160. Such a token service 160 can use large random number in combination with other systems, such as timing systems, to limit and secure the use of sensitive data being communicated over networks such as networks 120.

In some systems, information from a POS device 110 can be used by a token service 160 to generate a secure unique URL via URL generator 152 that has a use specific to operator computer system 108 or POS device 110. The secure URL may be limited for use by user 122 and/or user device 124. Additional limits can be applied to specific items 128 in association with a specific user 122 or POS device 110. For example, if request data received at authentication entity 106 includes information about an operator location for POS device 110, an object 128 at that operator location that a user 122 is considering acquiring, along with information about the user device 124 and a resource request, then a token service 160 can create a secure URL in conjunction with URL generator 152 to facilitate a resource offer specific to the location of POS device 110 and object acquisition that can only be accessed by user device 124. Additional limitations such as time limitations can be added, so that the secure URL can only be accessed via user device 124 for a limited amount of time (e.g., 10 minutes, 1 hour, 1 day, etc.). Token service 160 can be used in conjunction with other information both to allow for the generation of a tokenized URL with URL generator 152, as well as the managing of responses to the secure URL initiated from user device 124 (e.g., such as an indication that the secure URL has been accessed and a timestamp corresponding to that access, a number of instances in which the secure URL has been accessed when a time limit is exceeded, an unexpected device uses the secure URL, when other unauthorized use has been detected, etc.). Token generated by token server 160 may be also be usable to enable access to secure information. For example, a token may be generated for user 122 and/or user device 124. Requests to access secure information from an authorized device (e.g., client device 124 or POS device 110) may include an instance of the token to authenticate the request.

As described above, in some examples, authentication entity and resource issuing system 104 can, in some implementations, be the same system. In such a system, token service 160 can further act to generate tokens for resource numbers or other aspects of transactions which involve resource system 104. In additional examples, other aspects of system 100 can further be altered or include additional or intervening elements, such as multiple users, users with shared accounts, additional merchant or operator systems, subsystems that can operate independently, such as the use of an independent SMS service 156, or any other such structure for system 100.

Figure 1B:
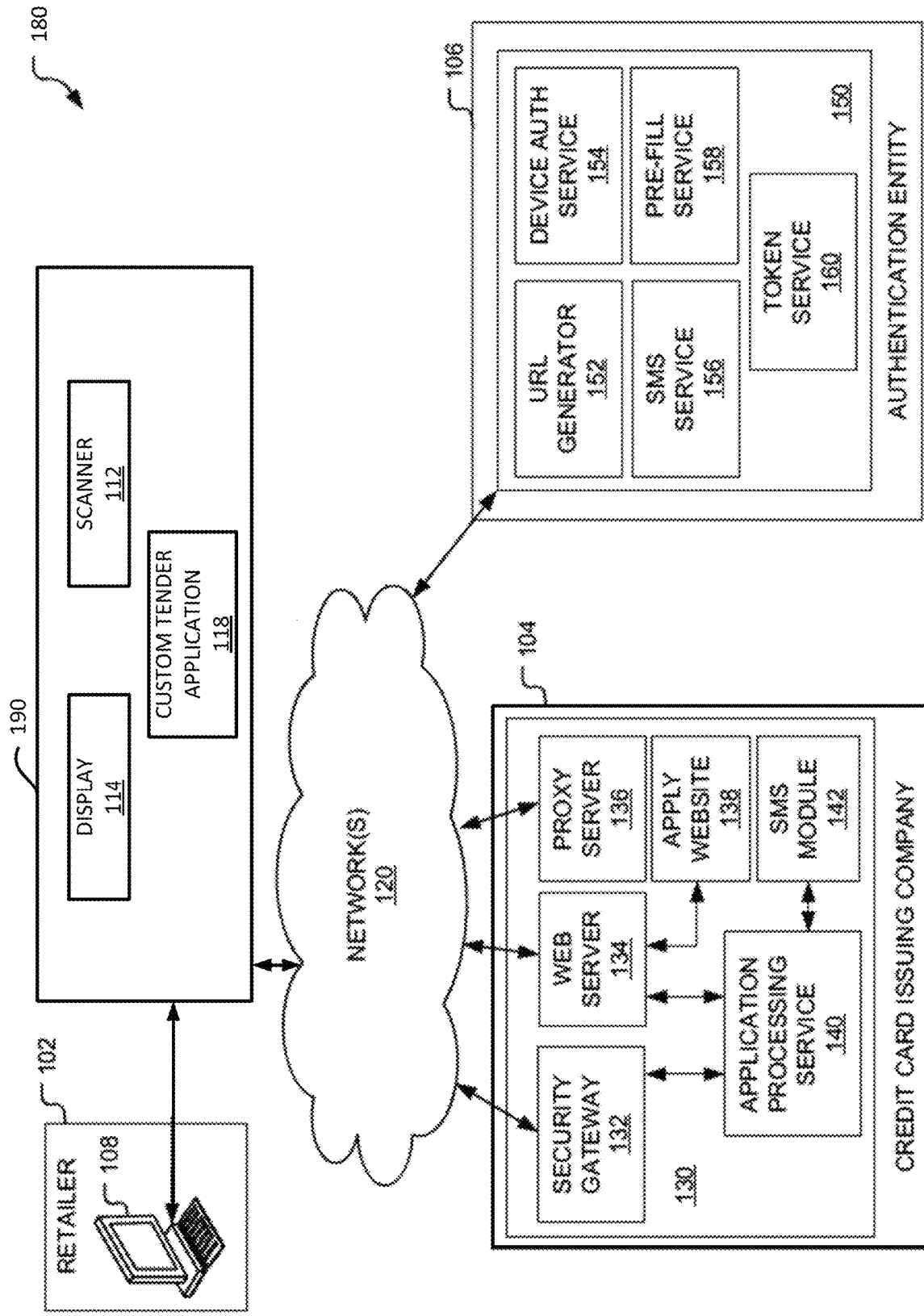
FIG. 1B illustrates aspects of the example system that can be used with identifying, displaying, and executing alternative acquisition protocols according to aspects of the present disclosure.

FIG. 1B illustrates aspects of the example system that can be used with identifying, displaying, and executing alternative acquisition protocols according to aspects of the present disclosure. System 180 of FIG. 1B is similar to system 100 of FIG. 1, except system 180 includes a custom tender application 118 operating on POS device 190. Custom tender application 118 can be used to access elements of a resource issuing system 104, an authentication entity 106, or any other such system as part of custom tender operations and/or acquisition protocol operations outside the ecosystem of the POS device 190 in a similar manner to custom tender application 118 of FIG. 1A. Additionally implementations can include elements of custom tender application 118 operating on both a POS device such as POS device 190, as well as on a mobile device 124, or any other device including an additional third party device. In any such implementation, custom tender application 118 can be used to provide additional functionality to the POS device in a merchant system 108 environment that would not otherwise be available, including additional security that can be available through the custom tender application and associated back-end functionality described below.

Figure 2:
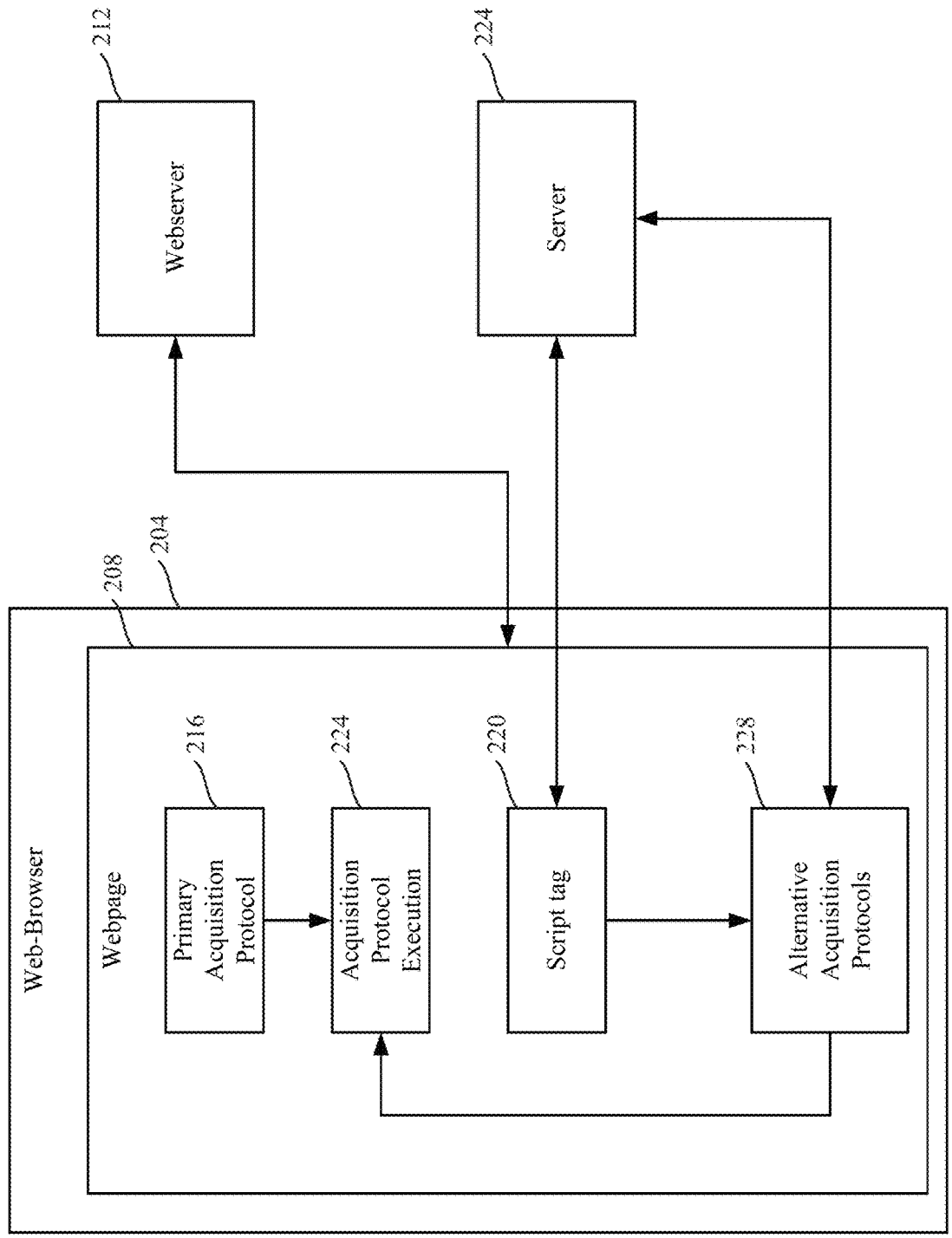
FIG. 2 illustrates an example block diagram depicting customizing a webpage to display alternative acquisition protocols according to aspects of the present disclosure.

FIG. 2 illustrates an example block diagram depicting customizing a webpage to display alternative acquisition protocols according to aspects of the present disclosure. Web-browser 204 is a software application executing on a computing device (e.g., mobile device such as a smartphone, desktop or laptop computer, server, etc.). The web-browser may receive instructions to access webpage 208 stored by webserver 212. The web-browser transmits a request to webserver 208 and receives instructions that enable web-browser to render webpage 208. The webpage may be configured to distribute objects and/or services to the user (e.g., physical objects, services etc.) or to the computing device (e.g., digital objects, services, etc.).

The web-browser executes the code of the webpage to render the webpage on the computing device. The webpage includes an identification of the object or service for distribution as well as representation of primary acquisition protocol 216 (e.g., a process that the computing device is to execute to enable distribution of the object to the user and/or computing device). The primary acquisition protocol 216 includes one or more conditions for the distribution of the object such as transmission of a set of resources by the user and/or computing device to webserver 212 and/or another webserver.

Webpage 208 includes script tag 220 positioned near the representation of primary acquisition protocol 216. Script tag 220 includes a script (e.g., a set of instructions), for identifying, display, and/or executing alternative acquisition protocols. For example, the script may obtain a user identifier and/or one or more attributes of the computing device. The script may then transmit the user identifier and/or attributes of the computing device to server 224. Server 224 may identify one or more possible alternative acquisition protocols based on the user identifier and/or attributes of the computing device. For example, server 224 may identify an alternative acquisition protocols based on a geolocation of the computing device. Server then selects from the possible alternative acquisition protocols one or more alternative acquisition protocols to be transmitted to webpage 208.

In some instances, server 224 assigns a score to each potential alternative acquisition protocols based on a likelihood that the user and/or computing device will select an alternative acquisition protocol or a degree in which the alternative acquisition protocol is tailored to the user and/or computing device. Server 224 then selects one or more alternative acquisition protocols based on the score (e.g., the n alternative acquisition protocols with a highest score, the alternative acquisition protocols that have a score greater than a threshold score, or the like). The score may be assigned by a statistical analysis of the possible alternative acquisition protocols, the user identifier, information known about the user identifier (e.g., demographic information, available resources, historical instances in which the user identifier was associated with selecting alternative acquisition protocols, etc.), the computing device, or the like.

Alternatively, the score may be generated by machine-learning. A machine-learning model may be trained using instances in which alternative acquisition protocols have been presented on webpages and/or selected for use in acquiring objects. The machine-learning model may then execute to generate a prediction associated with the alternative acquisition protocol (e.g., a prediction of the likelihood that the alternative acquisition protocols will be selected, etc.). The prediction may be the score assigned to the alternative acquisition protocols or the prediction may be processed to derive the score. The machine-learning model may be a classifier such as, but not limited to, a support vector machine, logistic regression, nearest neighbor, k-means, decision tree, Naïve Bayes, or any other classifier).

Server 224 transmits selected alternative acquisition protocols back to webpage 208. Script tag 220 receives the selected alternative acquisition protocols and determines which alternative acquisition protocol to display on webpage 208. Script tag 220 may select a first alternative acquisition protocol 228 to be displayed. Alternative acquisition protocol 228 may be an alternative acquisition protocol with a highest score of the selected alternative acquisition protocol transmitted to webpage 208. Script tag 220 may include instructions for obtaining additional instructions (e.g., such as JavaScript, or the like) from server 224. For example, if a particular alternative acquisition protocol is selected, then a new webpage may be displayed. The new webpage may be included in script tag 220, the new webpage may have been received when the selected alternative acquisition protocols 228 were transmitted to webpage 208, or the selection of the alternative acquisition protocols 228 may cause a request for the new webpage to be transmitted to server 224. The new webpage may information regarding the selected alternative acquisition protocols, requests for additional information to enable execution of the selected alternative acquisition protocol, etc. In another example, input request additional alternative acquisition protocols may cause the script tag 220 instructions to retrieve additional alternative acquisition protocols from server 224.

Acquisition protocol execution 224 includes instructions that execute a selected acquisition protocol. Input may be received selecting primary acquisition protocol 216 or alternative acquisition protocol 228. Webpage 208 then executes the selected acquisition protocol to enable exchange of the object or service. If the input selects primary acquisition protocol 216, then webpage 212 executes primary execution protocol 216 by requesting additional information (e.g., geolocation of the user or computing device to which the object may be transmitted, an identification of a set of resources to be transmitted to webserver 204, etc.) to enable the exchange of the set of resources for the object and transmission of the object (or providing the service) to the user and/or computing device.

If the input selects alternative acquisition protocol 228, then instructions in script tag 220 execute to obtain the additional information as well as other information needed for a service provider of the alternative acquisition protocol to facilitate the transmission of the set of resources to the webserver 212, transmission of the object to the user and/or computing device, and transmission of resources from the user and/or computer device to the server provider. The instructions in the script tag may cause server 224 to transmit a new webpage. The new webpage may enable the user and/or computing device to input the requested information and transmit the requested information back to server 224.

Figure 3:
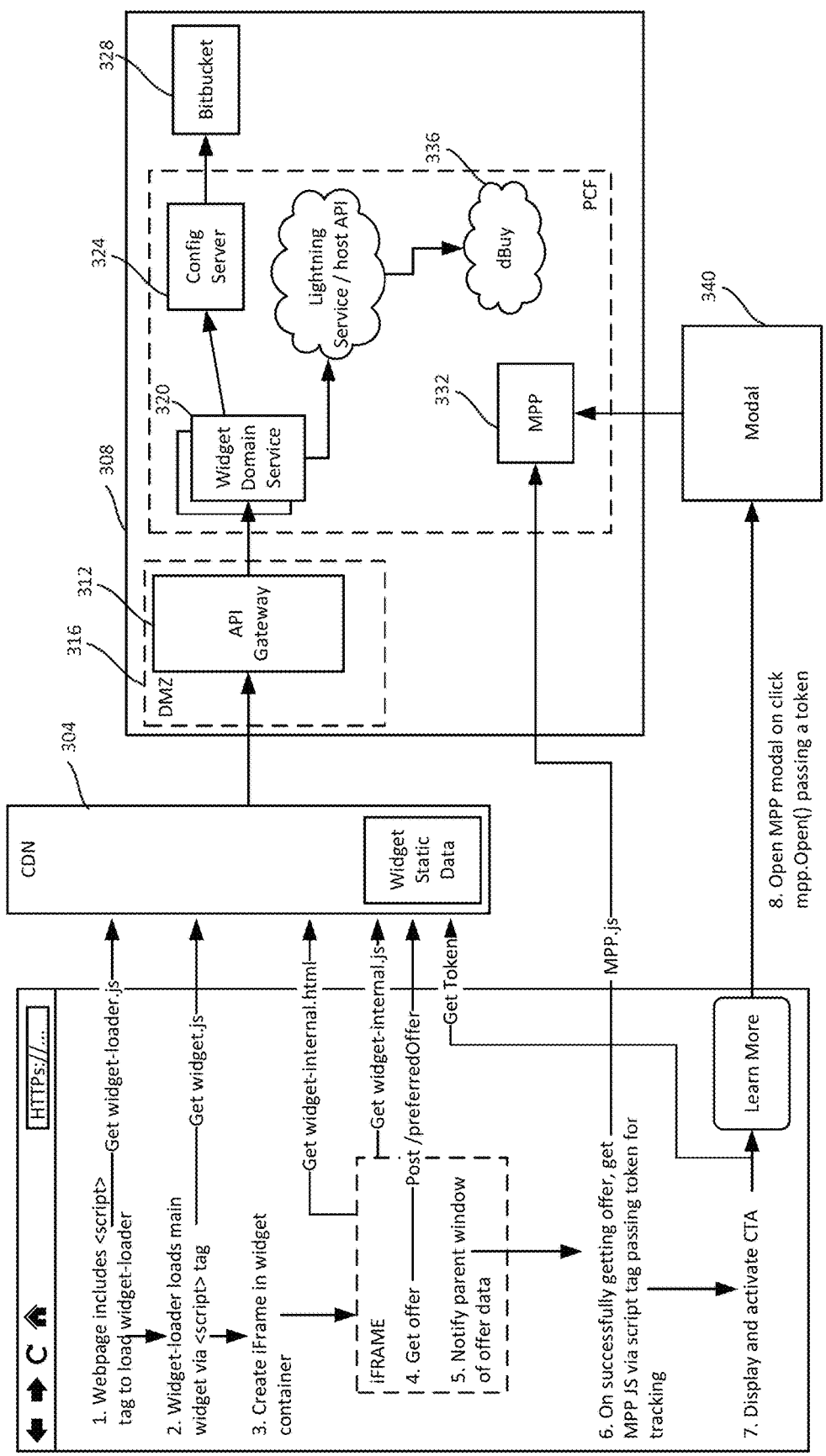
FIG. 3 illustrates an example block diagram depicting web-browser operations within a system for customizing a webpages to display alternative acquisition protocols according to aspects of the present disclosure.

FIG. 3 illustrates an example block diagram of an architecture for customizing a webpage to display and execute alternative acquisition protocols according to aspects of the present disclosure. A webpage may be defined by an operator (e.g., merchant) that distributes objects and services through the webpage. The webpage may include an identification of a primary acquisition protocol which may execute to facilitate the distribution of the objects or services. The primary acquisition protocol may identify a set of resources that are to be transmitted to the webserver, operator of the webpage, or service provider of the webpage to enable the distribution of the object or service to the user or computing device. The webpage data may also include a script tag that includes instructions for modifying the appearance and/or function of the function by identifying, displaying, and/or executing alternative acquisition protocols.

When the webpage is loaded by the web-browser (e.g. such as web-browser 204 of FIG. 2), the web-browser executes script tags embedded into the webpage. The script tags include calls to content delivery network (CDN) 304 to obtain instructions and/or data to load a widget within the webpage and to obtain content for the widget. Some of the calls may be satisfied by CDN 304. For example, CDN 304 may include static widget data (e.g., data common to most widgets) that can be passed back to the webpage. Some widget data may include instructions and/or data that may be particular to an operator, webpage, user, computing device, or the like. For data that is particular to the operator, webpage, user, computing device, the script tag includes a link to a location that stores the requested data. As depicted, the calls identify SYF 308 as the location of the request instructions and/or data. SYF 308 may include one or more interconnected devices that enable remote execution of instructions within web-browser (e.g., such as through webpages), identification and/or execution of acquisition protocols, and/or the like. SYF 308 stores instructions and data usable by script tags in webpages to load widgets and facilitate the identification, display, and/or execution of alternative acquisition protocols within the webpage. SYF 308 may also provide one more services to webpages, users, and/or computing devices.

The widget may execute within the webpage as a semi-independent code module. The widget may be loaded by executing the script tag calls GET (syf-widget-loader.js), which requests a JavaScript loader to load the widget and GET (syf-widget.js), which requests JavaScript instructions of the widget itself. CDN 308 may forward the request for the loader and widget to API gateway 312, which operates in a demilitarized zone (DMZ) 316, within SYF 308. API gateway 312 can include interfaces for translating calls from CDN, webpages, and/or other devices into a protocol recognizable by the components and services of SYF. DMZ 316 may be a partitioned portion of SYF 308 that separates the internal operations of SYF 308 from the outward facing services provided to external devices (e.g., such as to CDN 304, webpages, and/or other devices). DMZ 316 insulates internal components and services of SYF 308 from external devices thereby securing the internal components and services of SYF.

API gateway 312 may translate the received calls from CDN 304 and generate internal calls to widget domain service 320. Widget domain service 320 obtains configuration information for the widget from configuration server 324. The configuration information may be based on the operator that runs the webpage such that the widget can be configured to conform to constraints of the operator, include content that may be particular to the operator, and/or maintain a look and feel that corresponds to the look and feel of the webpage. Configuration server 324 may obtain configuration information and executable instructions (e.g., JavaScript, or the like) that make up the widget loader and the widget from a repository 328. The configuration information, widget loader instructions, and widget instructions may then be passed through DMZ 316 to CDN 304 to the webpage.

The web-browser may load the widget within the webpage. In some instances, the web-browser may load an iFrame and load the widget within the iFrame. Once loaded, the widget may request content to display via GET (syf-widget,internal.html), which requests hypertext markup language (HTML) instructions that define the content, layout, etc. that will be displayed in the widget. The call may pass through CDN 304 to SYF 308 as previously described. The widget may then request alternative acquisition protocol data from SYF 308 (e.g., via POST (preferredOffer)).

SYF 308 may receive information corresponding to the operator, webpage, user, and/or computing device to dynamically determine one or more alternative acquisition protocols to transmit to the widget. The information may be previously stored in SYF 308 (e.g., in response to a previous instance in which the user and/or computing device requested alternative acquisition protocols), obtained from the web-browser using instructions embedded in the webpage, from the operator, a combination thereof, or the like. SYF 308 may then identify a set of possible alternative acquisition protocols that may be available to the user and/or computing device. SYF 308 may generate a score for the set of possible alternative acquisition protocols using a statistical analysis of the alternative acquisition protocols and information known about the user and/or computing device. For example, some acquisition protocols may be more efficient for a particular user and/or computing device then other acquisition protocols. In some instances, a machine-learning model (e.g., a classifier, etc.) may be used to generate the scores. SYF 308 then transmits the alternative acquisition protocols that have a highest score (e.g., the top x alternative acquisition protocols, the alternative acquisition protocols that have a score greater than a threshold, or the like).

Once the alternative acquisition protocols are received by the widget, the widget transmits a notification to the main portion of the webpage. The script tag then executes a call to multi-product platform MPP 332 requesting JavaScript instructions (e.g., MPP.js) and a tracking token. MPP 332 can dynamically evaluate context-based operator and client information to intelligently process user requirements. MPP 332 may track user views and interactions through interface flows, operator preferences, operator configurations, object/service lifecycles and variations over time, acquisitions, resource requests, resource allocations, and other such data, to improve object performance, presentation of objects, and dynamic options with various objects or services.

MPP 332 returns the requested instructions and the token to the webpage. The token may be a data structure that is generated to be unique to the user. The token may be used to track the user across webpages (e.g., to enable consistent presentation of alternative acquisition protocols selected for that user) and to authenticate the current webpage session. For example, if a particular alternative acquisition protocols is selected, an indication of the selection and the token may be transmitted to SYF 308. SYF 308 may authenticate the selection by matching the received token with the token that was transmitted to the webpage. If the tokens match then the selection is authentic.

The webpage then displays the alternative acquisition protocols available to the user. Input may be received selecting an alternative acquisition protocol or a request for more information (e.g., via a "learn more" button, or the like). Selection of an alternative acquisition protocols or information request may cause a call to dBuy 336 (through CDN 304, widget domain service, lightning service/operator API) with the token (authenticating the call and identifying the user). dBuy 336 may use APIs (e.g., lightning service) to translate SYF 304 communications into a protocol of the resource allocation service of the operator that processes the primary interaction protocol. During execution of the alternative acquisition protocol, dBuy 336 may execute to facilitate a portion of the protocol such as transmitting resources to the resource allocation service of the operator on behalf of the user and/or computing device and requesting distribution of the object and/or service to the user and/or computing device.

Selection of an alternative acquisition protocols or information request may cause an MPP modal 340 to open (e.g., via mpp.Open( ) and including the token, or the like) providing additional information (e.g., identification of the alternative acquisition protocol, description of the alternative acquisition protocol process, terms, service provider of the alternative acquisition protocol, or the like), instructions for executing the selected alternative acquisition protocols, links to a service provider (e.g., resource issuer) associated with the selected alternative acquisition protocol. Any further interactions with the model may be monitored by MPP 332, which use the interactions for future selection of alternative acquisition protocols, user tracking, and/or the like.

Figure 4:
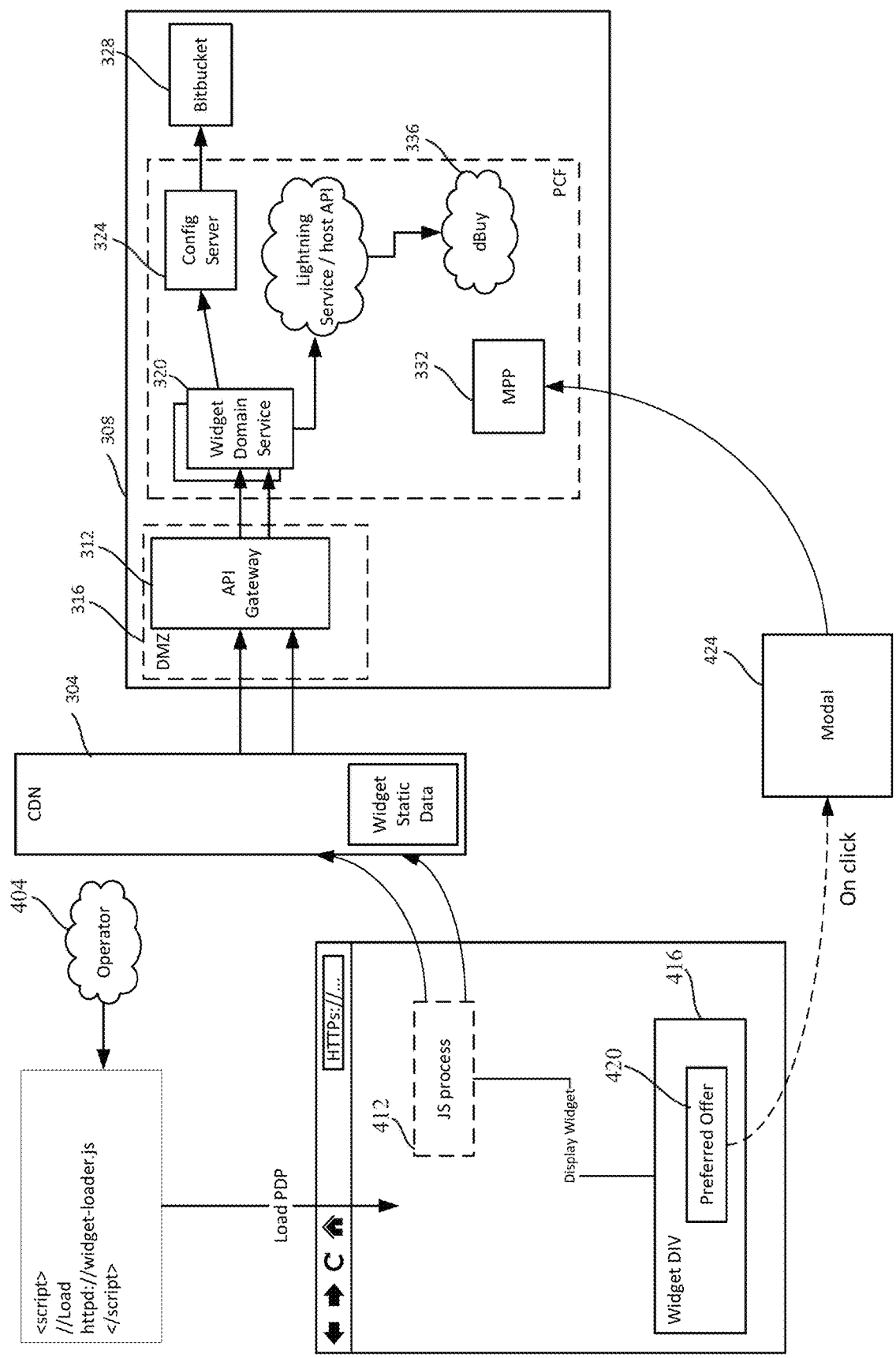
FIG. 4 illustrates an example block diagram depicting operator operations within a system for customizing a webpages to display alternative acquisition protocols according to aspects of the present disclosure.

FIG. 4 illustrates an example block diagram depicting operator operations within a system for customizing a webpages to display alternative acquisition protocols according to aspects of the present disclosure. Operator 404 may define a webpage for the distribution of objects and/or services. Operator 404 may include script tag 408 in the webpage code that executes when the webpage is loaded by a web-browser. The script tag may execute JavaScript process 412, which may execute calls to CDN 304 and SYF 308 to request a widget loader, a widget, content for the widget, etc. as previously described. Once the requested data is obtained by JavaScript process 412, the widget loader may be executed to generate widget 416 within the webpage. Widget 416 may include an identification of alternative acquisition protocol 420 that provides an alternative process for acquiring the object and/or service of the webpage.

When selected (e.g., clicked), the widget may open modal 424, which communications with MPP 332 to display providing additional information (e.g., identification of the alternative acquisition protocol, description of the alternative acquisition protocol process, terms, service provider of the alternative acquisition protocol, or the like).

Figures 5A, 5B:
FIGS. 5A and 5B illustrates graphical user interfaces of customized webpages displaying alternative acquisition protocols according to aspects of the present disclosure.

FIGS. 5A and 5B illustrates graphical user interfaces of customized webpages displaying alternative acquisition protocols according to aspects of the present disclosure. User interface 504 of FIG. 5A includes a webpage of an operator distributing an object (e.g., chair 508). The webpage identifies a primary acquisition protocol (e.g., a process that includes an exchange of set of resources, $1,499.00, for an object or service such as chair 508). In some instances, a user may not be capable of executing the primary acquisition protocol (e.g., due to lack of resources, or the like). Widget 512 may be provided below the object and display alternative acquisition protocols to the user to enable the user to acquire the object. When the widget loads, the widget requests an identification of alternative acquisition protocols that can be displayed within the widget.

The server may use user information (e.g., a user identifier, mobile device identifier, a hardware/software fingerprint of the mobile device, a geolocation of the mobile device, timestamp, etc.) and the object to dynamically define a particular alternative acquisition protocol in real-time for display within the widget. For example, the server may identify featured alternative acquisition protocols that may be available to users in the same geolocation as the user or that may only be available for a limited time. The suitability of an alternative acquisition protocol to a particular may be determined by a set of features extracted from the user information, operator or webpage information, object information, machine-learning model (e.g., a predictive model such as a classifier or the like), and/or the like. Examples of the one or more features include, but are not limited the terms of the alternative acquisition protocol relative to the particular user, a rate in which the set of resources are to be transmitted from the user and/or user device to a service provider of the alternative acquisition protocol, a quantity of additional resources (to the set of resource) that are to be transmitted by the user, a time interval over which the user is transmit subsets of the set of resources to the service provider, user identifier, geolocation of the user, current resource status of the user, object value, primary acquisition protocol, or the like.

The server may score alternative acquisition protocols using the one or more features. The score may be indicative of a suitability of the alternative acquisition protocol to the particular user. The server may then select alternative acquisition protocols that have a highest score (e.g., a best suited to the particular user). For example, the server may select the top n alternative acquisition protocols, the alternative acquisition protocols that have a score greater than a threshold, and/or the like. In some instances, the server may generate the score using a machine-learning model as previously described.

Widget 512 may display an identification of the selected alternative acquisition protocol (e.g., having a highest score, etc.). Selection of the alternative acquisition protocol may open a modal (or alternatively, a new webpage) that provides additional information corresponding to the alternative acquisition protocol as shown in user interface 516 of FIG. 5B. User interface 516 include a modal presented over webpage displayed in user interface 504. The modal provide additional information on selected alternative acquisition protocol 520 include terms (e.g., rate in which subsets of resources are to be transmitted to the service provider of the alternative acquisition protocol, time interval over which the set of resource are to be transmitted to the service provider, etc.). The modal provides link to other modals and/or webpages that provide additional information on the alternative acquisition protocol. If the user and/or user device has an established relationship with the service provider (e.g., user is a cardholder of the service provider), then user interface 516 may include a link to execute the alternative acquisition protocol and/or to return to user interface 504. If the user and/or user device does not have an established relationship with the service provider, then the modal may include a link to another modal or webpage for pre-qualifying or qualifying for the alternative acquisition protocol.

When the modal loads, the modal requests content from the server (e.g., such as SYF 304 and/or a particular service of SYF 304 such as MPP 332). The content can include the additional information corresponding to the alternative acquisition protocol and/or additional script tags (e.g., HTML and/or JavaScript instructions). The modal may then execute the additional script tags to provide dynamic content and functionality. The script tag, the widget, and/or the modal may include instructions for obtaining additional script tags. Since the instructions of the widget and modal are determined dynamically at runtime, the content and functionality of the widget and/or modal can be uniquely tailored to individual users or sets of users.

Though user interfaces 504 and 516 as shown are displayed via an interface of a mobile device, user interfaces 504 and 516 may be displayed on any device configured to operate a web-browser (e.g., computing devices, special-purpose devices, servers, thin clients, etc.).

FIG. 6 illustrates a flowchart of an example process for customizing a webpage to display alternative acquisition protocols according to aspects of the present disclosure. At block 604, a web-browser executing on a computing device may receive a webpage from a first server. The webpage may be defined by an operator for the identification and distribution of objects and/or services to users and/or computing devices. The webpage may include a primary acquisition protocol that may be executed to facilitate an exchange of a set of resources (to the operator) for the object (to be transmitted to a user).

At block 608, a call is executed (e.g., by a computing device the web-browser, or the like) to a second server, wherein the call includes a user identifier of a user interacting with the webpage and a request for an identification of one or more alternative acquisition protocols based on the user identifier. The second server may include one or more devices configured to provide content to webpages such as SYF 308 of FIG. 3. The call may include a request to load a widget within the webpage that can display the requested alternative acquisition protocols.

At block 612, the web-browser receives, in response to executing the call to the second server, JavaScript code that executes to provide information associated with the one or more alternative acquisition protocols. The JavaScript code may include instructions for establishing the widget within the webpage (e.g., instructions for a loader and instructions for the widget itself). When the JavaScript executes, the web-browser loads the widget into the webpage (e.g., in the body of the webpage, in a frame such as an iFrame, or the like). The widget then requests an identification of alternative acquisition protocol for the particular user and/or user device from the second server.

The second server identifies a particular alternative acquisition protocol that may be most suitable to the user and/or computing device. The second server may identify a set of possible alternative acquisition protocols. The second server may then assign a score to the set of possible alternative acquisition protocols using a statistical analysis, machine-learning, user input, or the like. The score may represent suitability of the alternative acquisition protocol to the user, a likelihood that the user will select the alternative acquisition protocol, and/or the like. For example, the user identifier, other user information (e.g., demographic information, etc.), computing device information (e.g., hardware and/or software information, process resources, etc.), information of regarding the object (e.g., such as value, type, etc.), a current timestamp, terms of the operator, terms of service providers (that facilitate alternative acquisition protocols), and/or the like may be used to derive a set of features. A trained machine-learning model (e.g., such as a classifier, or the like) may be executed using the set of features to generate a prediction. The prediction may correspond to a predicted suitability of the alternative acquisition protocol to the user or a predicted likelihood that the user will select the alternative acquisition protocol.

The second server then determines which alternative acquisition protocols are to be transmitted to the widget. In some instances, the second server may select the alternative acquisition protocol based on one or more criteria such as, but not limited to, the alternative acquisition protocol with a highest score, the x alternative acquisition protocols having a highest score, the alternative acquisition protocols that have a score greater than a threshold, or the like. In other instances, the second server may transmit an identification of the set of alternative acquisition protocols to the widget. The widget may then execute instructions for selecting one or more alternative acquisition protocols and displaying an identification of the one or more selected alternative acquisition protocols.

Alternatively, or additionally, the second sever may identify alterative content to be presented within a portion of the webpage. The alternative content may be identified based on the current browsing session associated with the webpage (e.g., user interaction with the webpage, a time interval over which the webpage has been open, an amount of time a mouse cursor has been over particular content or over a particular location of the webpage, content selected by the user, content presented by the webpage, and/or the like), information associated with historical browsing sessions related to the webpage or related webpages (e.g., based on login information, cookies, Internet Protocol (IP) address, and/or the like), user information associated with the user (e.g., such as, but not limited to demographic data, employment data, previous acquisition protocols selected, income, etc.), and/or the like. For example, the second server may determine that based on the user information and one or more cookies that the user may be interested in a service and/or service provider that provides various acquisition protocols. The second server may then select alternative content (e.g., such as text, images, audio, video, combinations thereof, or the like) that corresponds to the service and/or service provider. In some instances, the alternative content may be an advertisement or the like. In other instances, the alternative content may be information associated with the operator, operators associated with the operator, the webpage, related webpages, the acquisition protocol and/or the entity providing thereof, the alternative acquisition protocols and/or the entities providing thereof, the second server, the object, combinations thereof, or the like.

At block 616, a modified webpage may be generated. The modified webpage can include a modification to a portion of the webpage based on at least one of the one or more alternative acquisition protocols and/or the alternative content. Alternatively, or additionally, the modified webpage can include a modification to a portion of the webpage based on the alternative content. The modified webpage may be generated using the identification of the alternative acquisition protocols received from the second server and/or the JavaScript code. The content may include the information corresponding to the alternative acquisition protocols, requests for additional information from the user, links to even more information corresponding to the alternative acquisition protocols, links to generate a modal, links to request additional alternative acquisition protocols, etc.

In some instances, the modified webpage may be received by the web-browser (e.g., from a webserver hosting the webpage, the second server, and/or the like). In other instances, the modified webpage may be generated by the web-browser from instructions received from the webserver hosting the webpage, the second server, and/or the like. For example, the modified webpage may be generated by loading instructions configured to present the selected alternative acquisition protocols and/or the alternative content within the webpage (e.g., by the widget, a modal, within an iFrame, within a popup window or another web-browsing window, and/or the like).

At block 620, the web-browser displays the modified webpage (e.g., the content of the widget). The process may wait until further input is received. If input is received selecting the primary acquisition protocol, then the primary acquisition protocol may execute a series of steps that cause the user and/or user device to transmit the request set of resources and the object to be transmitted to the user and/or user device. If input is received selecting the widget and/or the alternative acquisition protocol, then the widget may provide additional functionally. For example, the widget may cause a modal to open over the webpage to provide additional information regarding the alternative acquisition protocol. The modal may also enable execution of the alternative acquisition protocol. Alternatively, selection of the widget or alternative acquisition protocol may cause the web-browser to open a new webpage that includes additional information and/or executes the alternative acquisition protocol.

Figure 7:
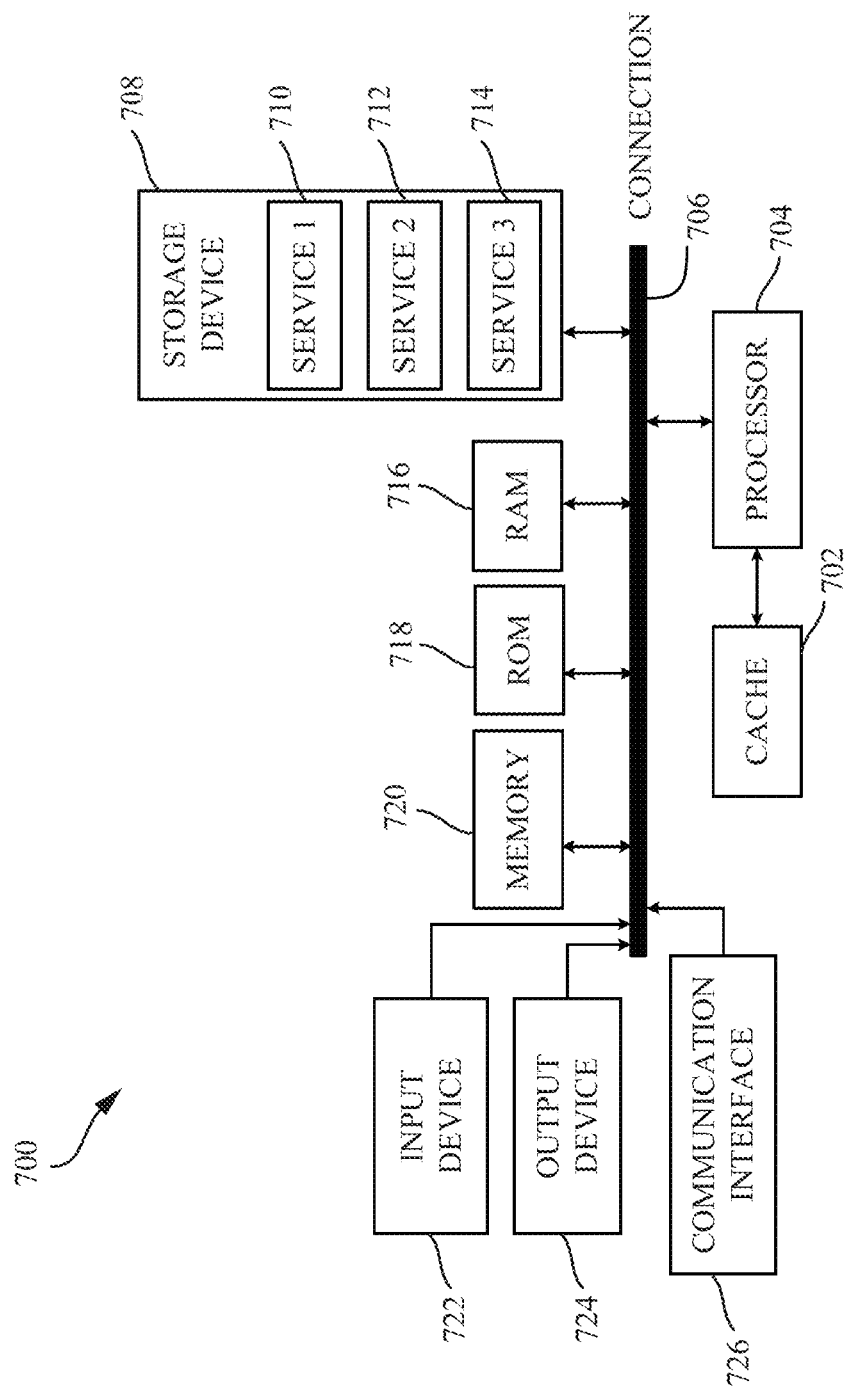
FIG. 7 shows a computing system architecture including various components in electrical communication with each other using a connection according to aspects of the present disclosure.

FIG. 7 shows a computing system architecture including various components in electrical communication with each other using a connection in accordance with various examples. FIG. 7 illustrates a computing system architecture 700 including various components in electrical communication with each other using a connection 706, such as a bus, in accordance with some implementations. Example system architecture 700 includes a processing unit (CPU or processor) 704 and a system connection 706 that couples various system components including the system memory 720, such as ROM 718 and RAM 716, to the processor 704. The system architecture 700 can include a cache 702 of high-speed memory connected directly with, in close proximity to, or integrated as part of the processor 704. The system architecture 700 can copy data from the memory 720 and/or the storage device 708 to the cache 702 for quick access by the processor 704. In this way, the cache can provide a performance boost that avoids processor 704 delays while waiting for data. These and other modules can control or be configured to control the processor 704 to perform various actions.

Other system memory 720 may be available for use as well. The memory 720 can include multiple different types of memory with different performance characteristics. The processor 704 can include any general purpose processor and a hardware or software service, such as service 1 710, service 2 712, and service 3 714 stored in storage device 708, configured to control the processor 704 as well as a special-purpose processor where software instructions are incorporated into the actual processor design. Services execute to identify, display, and/or execute acquisition protocols. For example, services may receive instructions from a webserver that identify a primary or alternate acquisition protocol and in response, facilitate execution of the acquisition protocol to enable a user or user device to acquire an object or service. The processor 704 may be a completely self-contained computing system, containing multiple cores or processors, a bus, memory controller, cache, etc. A multi-core processor may be symmetric or asymmetric.

To enable user interaction with the computing system architecture 700, an input device 722 can represent any number of input mechanisms, such as a microphone for speech, a touch-sensitive screen for gesture or graphical input, keyboard, mouse, motion input, speech and so forth. An output device 724 can also be one or more of a number of output mechanisms known to those of skill in the art. In some instances, multimodal systems can enable a user to provide multiple types of input to communicate with the computing system architecture 700. The communications interface 726 can generally govern and manage the user input and system output. There is no restriction on operating on any particular hardware arrangement and therefore the basic features here may easily be substituted for improved hardware or firmware arrangements as they are developed.

Storage device 708 is a non-volatile memory and can be a hard disk or other types of computer readable media which can store data that are accessible by a computer, such as magnetic cassettes, flash memory cards, solid state memory devices, digital versatile disks, cartridges, RAMs 716, ROM 718, and hybrids thereof.

The storage device 708 can include services 710, 712, 714 for controlling the processor 704. Other hardware or software modules are contemplated. The storage device 708 can be connected to the system connection 706. In one aspect, a hardware module that performs a particular function can include the software component stored in a computer-readable medium in connection with the necessary hardware components, such as the processor 704, connection 706, output device 724, and so forth, to carry out the function.

The disclosed system can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example, and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor. The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, WA, and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the terms "computer readable medium", "computer readable storage medium", "machine-readable medium" and "machine-readable storage medium" should be taken to include a single medium or multiple media (e.g., a centralized or distributed database, and/or associated caches and servers) that store the one or more sets of instructions. The terms "computer readable medium", "computer readable storage medium", "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112 (f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included (e.g. in FIGS. 6-8). A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method comprising:
    receiving a request for access to one or more alternative acquisition protocols associated with a computing device, wherein the request is received from a webpage including a native acquisition protocol, and wherein the request includes a user identifier corresponding to a user of the computing device;
    generating a score for a set of alternative acquisition protocols based on the user identifier, wherein the score associated with an alternative acquisition protocol corresponds to a predicted likelihood that the user will execute the alternative acquisition protocol;
    selecting a particular alternative acquisition protocol from the set of alternative acquisition protocols, wherein the selection is based on the score; and facilitating a transmission including the particular alternative acquisition protocol, wherein the particular alternative acquisition protocol includes instructions that execute upon being received by the computing device, and wherein the instructions are configured to modify an appearance of the webpage to include the particular alternative acquisition protocol.

2. The method of claim 1, wherein the score for the set of alternative acquisition protocols is generated by a trained machine-learning model.

3. The method of claim 1, wherein the score is further based on a browsing history of the user.

4. The method of claim 1, wherein the score is further based a value of an object presented by the webpage.

5. The method of claim 1, wherein the score is further based on user interaction with the webpage.

6. The method of claim 1, wherein the score is further based on a timestamp corresponding to when the webpage was loaded.

7. The method of claim 1, wherein the instructions include JavaScript code configured to execute within the webpage to present the particular alternative acquisition protocol.

8. A system comprising:
one or more processors; and
a non-transitory computer-readable medium storing instructions that when executed by the one or more processors, cause the one or more processors to perform operations including
receiving a request for access to one or more alternative acquisition protocols associated with a computing device, wherein the request is received from a webpage including a native acquisition protocol, and wherein the request includes a user identifier corresponding to a user of the computing device;
generating a score for a set of alternative acquisition protocols based on the user identifier, wherein the score associated with an alternative acquisition protocol a corresponds to a predicted likelihood that the user will execute the alternative acquisition protocol;
selecting a particular alternative acquisition protocol from the set of alternative acquisition protocols based on the score; and
facilitating a transmission including the particular alternative acquisition protocol to the computing device, wherein the particular alternative acquisition protocol includes instructions that execute upon being received by the computing device to modify an appearance of the webpage to include the particular alternative acquisition protocol.

9. The system of claim 8, wherein the score for the set of alternative acquisition protocols is generated by a trained machine-learning model.

10. The system of claim 8, wherein the score is further based on a browsing history of the user.

11. The system of claim 8, wherein the score is further based a value of an object presented by the webpage.

12. The system of claim 8, wherein the score is further based on user interaction with the webpage.

13. The system of claim 8, wherein the score is further based on a timestamp corresponding to when the webpage was loaded.

14. The system of claim 8, wherein the instructions include JavaScript code configured to execute within the webpage to present the particular alternative acquisition protocol.

15. A non-transitory computer-readable medium storing instructions that when executed by one or more processors, cause the one or more processors to perform operations including:
receiving a request for access to one or more alternative acquisition protocols associated with a computing device, wherein the request is received from a webpage including a native acquisition protocol, and wherein the request includes a user identifier corresponding to a user of the computing device;
generating a score for a set of alternative acquisition protocols based on the user identifier, wherein the score associated with an alternative acquisition protocol a corresponds to a predicted likelihood that the user will execute the alternative acquisition protocol;
selecting a particular alternative acquisition protocol from the set of alternative acquisition protocols based on the score; and
facilitating a transmission including the particular alternative acquisition protocol to the computing device, wherein the particular alternative acquisition protocol includes instructions that execute upon being received by the computing device to modify an appearance of the webpage to include the particular alternative acquisition protocol.

16. The non-transitory computer-readable medium of claim 15, wherein the score for the set of alternative acquisition protocols is generated by a trained machine-learning model.

17. The non-transitory computer-readable medium of claim 15, wherein the score is further based on a browsing history of the user.

18. The non-transitory computer-readable medium of claim 15, wherein the score is further based a value of an object presented by the webpage.

19. The non-transitory computer-readable medium of claim 15, wherein the score is further based on user interaction with the webpage.

20. The non-transitory computer-readable medium of claim 15, wherein the instructions include JavaScript code configured to execute within the webpage to present the particular alternative acquisition protocol.

* * * * *